United States Patent
Ginsberg et al.

(10) Patent No.: US 10,691,779 B2
(45) Date of Patent: Jun. 23, 2020

(54) SERVICE TOOL CREDENTIAL MANAGEMENT

(71) Applicant: Otis Elevator Company, Farmington, CT (US)

(72) Inventors: David Ginsberg, Granby, CT (US); Mark Olthuis, Avon, CT (US); Fred G. Williams, Old Saybrook, CT (US); Jody Phouthavong, Stratford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 233 days.

(21) Appl. No.: 15/657,519

(22) Filed: Jul. 24, 2017

(65) Prior Publication Data
US 2019/0026445 A1 Jan. 24, 2019

(51) Int. Cl.
G06F 21/31 (2013.01)
H04L 29/06 (2006.01)
(Continued)

(52) U.S. Cl.
CPC ............ *G06F 21/31* (2013.01); *B66B 1/3461* (2013.01); *B66B 5/0087* (2013.01);
(Continued)

(58) Field of Classification Search
CPC ........ G06F 21/31; G06F 21/335; G06F 21/35; G06F 21/33; B66B 1/3461; B66B 5/0087; B66B 1/3407; H04L 9/0894; H04L 63/0807; H04L 63/102; H04L 63/105; H04L 63/107; H04L 63/108; H04L 67/10;
(Continued)

(56) References Cited

U.S. PATENT DOCUMENTS 6,615,175 B1 * 9/2003 Gazdzinski ............... B66B 1/34
187/396
7,194,763 B2 * 3/2007 Potter ...................... H04L 63/08
380/247
(Continued)

FOREIGN PATENT DOCUMENTS

CN 103449267 A 12/2013
CN 104477714 4/2015
(Continued)

OTHER PUBLICATIONS

Schindler Digital, The always-connected smart service solution, Schindler Sep. 2016, 11 pages.
(Continued)

*Primary Examiner* — Jayesh M Jhaveri
(74) *Attorney, Agent, or Firm* — Cantor Colburn LLP

(57) ABSTRACT

A service tool credential management system includes a storage medium operable to store a plurality of instructions and at least one processor configured to execute the instructions to send a credential request to a networked server to access an equipment controller with a service tool. The at least one processor is further configured to execute the instructions to receive an access credential responsive to the credential request and utilizing one or more fields of the access credential during interactions with the equipment controller to enable a level of access for the service tool to the equipment controller corresponding to the access credential.

16 Claims, 7 Drawing Sheets

(51) Int. Cl.
*H04L 29/08* (2006.01)
*G06F 21/33* (2013.01)
*G06F 21/35* (2013.01)
*H04W 12/00* (2009.01)
*H04L 9/08* (2006.01)
*B66B 5/00* (2006.01)
*B66B 1/34* (2006.01)

(52) U.S. Cl.
CPC .......... *G06F 21/335* (2013.01); *H04L 9/0894* (2013.01); *H04L 63/0807* (2013.01); *H04L 63/102* (2013.01); *H04L 63/105* (2013.01); *H04L 63/107* (2013.01); *H04L 63/108* (2013.01); *H04L 67/10* (2013.01); *B66B 1/3407* (2013.01); *G06F 21/35* (2013.01); *H04L 63/08* (2013.01); *H04W 12/00502* (2019.01); *H04W 12/00503* (2019.01)

(58) Field of Classification Search
CPC ......... H04L 63/08; H04L 29/06; H04L 29/08; H04L 9/08; H04W 12/00502; H04W 12/00503; H04W 12/00
See application file for complete search history.

(56) References Cited

U.S. PATENT DOCUMENTS

| | | | |
|---|---|---|---|
| 7,558,564 B2 * | 7/2009 | Wesby | G06Q 40/06 |
| | | | 455/419 |
| 8,806,593 B1 | 8/2014 | Raphel et al. | |
| 8,984,589 B2 | 3/2015 | Liu | |
| 9,019,071 B1 * | 4/2015 | Mallard | G07C 9/00087 |
| | | | 340/5.3 |
| 9,165,123 B1 * | 10/2015 | Mallard | G06F 21/31 |
| 9,216,509 B2 | 12/2015 | Renkis | |
| 9,801,053 B1 * | 10/2017 | Ziraknejad | H04W 12/04 |
| 10,257,179 B1 * | 4/2019 | Saylor | H04W 12/06 |
| 2003/0005308 A1 | 1/2003 | Rathbun et al. | |
| 2003/0126465 A1 | 7/2003 | Tassone et al. | |
| 2003/0225707 A1 * | 12/2003 | Ehrman | H04L 29/06 |
| | | | 705/64 |
| 2013/0031611 A1 | 1/2013 | Barreto | |
| 2015/0199863 A1 | 7/2015 | Scoggins et al. | |
| 2016/0107861 A1 | 4/2016 | Thebeau et al. | |
| 2016/0134686 A1 | 5/2016 | Youker et al. | |
| 2016/0239694 A1 | 8/2016 | Chin et al. | |
| 2016/0355375 A1 | 12/2016 | Simcik et al. | |
| 2016/0364927 A1 * | 12/2016 | Barry | H04L 63/08 |
| 2019/0122462 A1 * | 4/2019 | Wedzikowski | B66B 1/468 |

FOREIGN PATENT DOCUMENTS

| | | |
|---|---|---|
| CN | 105513235 | 4/2016 |
| KR | 20130009308 | 1/2013 |
| WO | 2014089242 | 6/2014 |
| WO | 2014200487 | 12/2014 |
| WO | 2016087478 | 6/2016 |
| WO | 2017037240 | 3/2017 |
| WO | 2017081507 | 5/2017 |

OTHER PUBLICATIONS

Brivo Onair Pass, Smartphone Building Access, retrieved from the Internet Aug. 15, 2017: https://www.brivo.com/products/brivo-onair/add-ons/mobile-pass/, 12 pages.

EP Application No. 18185353.2 Extended EP Search Report dated Sep. 18, 2018, 10 pages.

J. Kohl, Digital Equipment Corporation; C. Neuman, ISI; The Kerberos Network Authentication Service (V5), Internet Engineering Task Force, IETF; Standard, Internet Society (ISOC) 4, Sep. 1993, 112 pages.

EP Application No. 18185353.2 Office Action dated Sep. 26, 2019, 5 pages.

* cited by examiner

300

| USER ID1 302 | ID VERIFICATION1 312 | USER TYPE3 | ⎫ 322 |
| USER ID2 304 | ID VERIFICATION2 314 | USER TYPE1 | ⎫ 324 |
| USER ID3 306 | ID VERIFICATION3 316 | USER TYPE4 | ⎫ 326 |
| ⋮ | ⋮ | ⋮ | |
| USER IDN 308 | ID VERIFICATION4 318 | USER TYPE2 | ⎫ 328 |

| USER (402) | ALLOWED REGION (406) |
|---|---|
| USERA | REGIONA |
| USERB | REGIONA |
| USERC | REGIONA |
| USERD | REGIONA |
| USERE | REGIONA |
| USERF | REGIONA |
| USERG | REGIONA |
| USERH | REGIONA, REGIONB |

| GROUP/ROLE (502) | ALLOWED READ DATA IDS (504) | ALLOWED WRITE DATA IDS (506) | ALLOWED TIME (508) |
|---|---|---|---|
| MECHANIC | 1-5 | | 1 DAY |
| ADJUSTER | 6-10 | 1-5 | 7 DAYS |
| CUSTOMER | 1-4 | | 7 DAYS |
| ENGINEER | | 1-15 | 7 DAYS |

| USER | ALLOWED READ DATA IDS | ALLOWED WRITE DATA IDS | ALLOWED TIME |
|---|---|---|---|
| USER A | 9 | - | - |
| USER B | 9 | 7 | - |
| USER D | - | 15 | - |
| USER F | - | - | 1 DAY |

| SYSTEMS | REGION | SITE | KEYS |
|---|---|---|---|
| SYSTEM1 | REGIONA | SITEA | K1 (L1, L2, L3) |
| SYSTEM2 | REGIONA | SITEA | K2 (L1, L2, L3) |
| SYSTEM3 | REGIONA | SITEB | K3 (L1, L2, L3) |
| SYSTEM4 | REGIONB | SITEC | K4 (L1, L2, L3) |

SERVICE TOOL CREDENTIAL MANAGEMENT

BACKGROUND

The present disclosure relates to equipment service systems, and more particularly, to service tool credential management in equipment service systems.

Current service tools used for accessing equipment controllers (e.g., elevator controllers) typically rely on using a separate hardware tool that physically plugs into an equipment control system. Such service tools typically do not require additional credential management since the physical connection ensures that the service tool is used by an individual who is physically present at a specific location when using the service tool. As networked/wireless service tools are used in place of physically connected service tools, users of the service tools may not need to be physically present at the location of the equipment and may have access to many additional systems reachable through networked/wireless links. Pre-programmed certificates can be used to verify user credentials but may not be ideal in all circumstances.

BRIEF DESCRIPTION

According to some embodiments, a service tool credential management system is provided. The service tool credential management system includes a storage medium operable to store a plurality of instructions and at least one processor configured to execute the instructions to send a credential request to a networked server to access an equipment controller with a service tool, receive an access credential responsive to the credential request, and utilize one or more fields of the access credential during interaction with the equipment controller to enable a level of access for the service tool to the equipment controller corresponding to the access credential.

In addition to one or more of the features described above or below, or as an alternative, further embodiments may include where the networked server provides a cloud credentialing service operable to transmit the access credential responsive to the credential request.

In addition to one or more of the features described above or below, or as an alternative, further embodiments may include where the cloud credentialing service is operable to access a user database to confirm user information of the service tool and a credential database to retrieve the access credential based on a corresponding value from the user database.

In addition to one or more of the features described above or below, or as an alternative, further embodiments may include where the level of access for the service tool is limited based on a time constraint.

In addition to one or more of the features described above or below, or as an alternative, further embodiments may include where the level of access for the service tool is set based on a location of a system controlled by the equipment controller, and the one or more fields of the access credential include at least one key associated with the location, the system, and the level of access.

In addition to one or more of the features described above or below, or as an alternative, further embodiments may include where the service tool acquires and stores a plurality of credentials associated with a plurality of service locations.

In addition to one or more of the features described above or below, or as an alternative, further embodiments may include where the level of access includes one or more of: no access, read-only access, and modification access assignable on an individual feature or group of features basis.

In addition to one or more of the features described above or below, or as an alternative, further embodiments may include where the level of access for the service tool is verified as meeting one or more constraints of an access control list on a data identifier basis prior to allowing access to a data item corresponding to the data identifier through the equipment controller.

In addition to one or more of the features described above or below, or as an alternative, further embodiments may include where one or more constraints are set based on a user type subject to one or more deviations defined for a user of the service tool.

In addition to one or more of the features described above or below, or as an alternative, further embodiments may include where the equipment controller is operable to control and monitor one or more elevator or escalator components.

According to some embodiments, a method of service tool credential management is provided. The method includes sending a credential request to a networked server to access an equipment controller with a service tool, receiving an access credential responsive to the credential request, and utilizing one or more fields of the access credential when interacting with the equipment controller to enable a level of access for the service tool to the equipment controller corresponding to the access credential.

Technical effects of embodiments of the present disclosure include service tool credential management to limit access to an equipment controller through credentials obtained from a networked server.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 4 is a schematic illustration of entries in a user database in accordance with an embodiment of the present disclosure;

FIG. 5 is another schematic illustration of entries in a user database in accordance with an embodiment of the present disclosure;

FIG. 6 is a schematic illustration of entries in a privileges table in accordance with an embodiment of the present disclosure;

FIG. 7 is a schematic illustration of entries in an exceptions table in accordance with an embodiment of the present disclosure;

FIG. 8 is a schematic illustration of entries in a credential database in accordance with an embodiment of the present disclosure.

DETAILED DESCRIPTION

A detailed description of one or more embodiments of the disclosed apparatus and method are presented herein by way of exemplification and not limitation with reference to the Figures.

Figure 1:
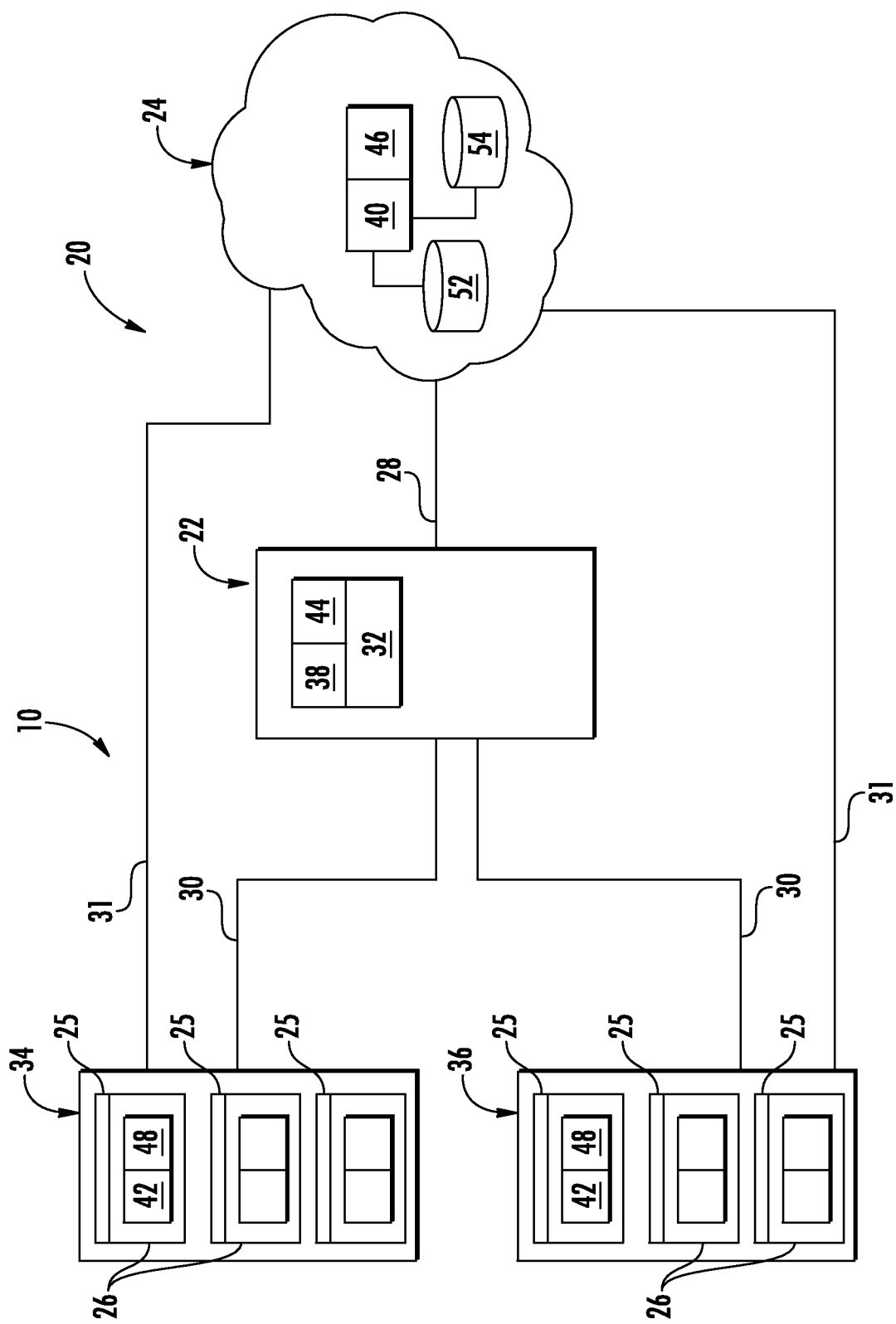
FIG. 1 is a schematic illustration of an equipment service system as one, non-limiting, exemplary embodiment of the present disclosure.

Referring to FIG. 1, an exemplary embodiment of an equipment service system 20, which may include, or may use portions of, a service tool 22, a networked server 24, and at least one equipment controller 26. The service tool 22 may communicate with the networked server 24 and/or at least one equipment controller 26 over respective communication pathways 28, 30 as part of a service tool credential management system 10 to authorize access for the service tool 22 with respect to at least one equipment controller 26. The service tool credential management system 10 can include any portion of the service tool 22, networked server 24, and equipment controller 26 used for credential management for users of the service tool 22. The equipment service system 20 may include any portion of the service tool 22, networked server 24, and equipment controller 26 used for monitoring and/or controlling one or more equipment components 25. The communication pathways 28, 30 may be associated with such communication protocols as Bluetooth®, Wi-Fi, Near Field Communications (NFC), infrared, mobile broadband (e.g., 3G, 4G, etc.), satellite, and others. The networked server 24 can facilitate communication between the equipment controller 26 and the service tool 22 by providing the service tool with a credential to securely access the equipment controller 26. One or more communication pathways 31 between the networked server 24 and equipment controller 26 can be used, for instance, to verify the credential of the service tool 22. Thus, information can flow over communication pathways 28 and 31, and a direct link can be established between the equipment controller 26 and the service tool 22 using communication pathway 30. Communication pathway 31 can use a different protocol for longer distance secure communication than protocols used by communication pathways 28 and 30, for example.

The service tool 22 may include a user interface 32 that facilitates system interaction with a user (e.g., an equipment repairperson/service technician). Non-limiting examples of the service tool 22 may include a smartphone, a tablet computer, laptop computer, and other electronic devices. The networked server 24 may be cloud-based (i.e., in a cloud network environment) as part of a cloud credentialing service 202 (FIG. 3) with access to a plurality of databases, such as a user database 52 and a credential database 54. The equipment service system 20 generally controls the flow of information between the service tool 22, the networked server 24 and/or the equipment controller 26. In some embodiments, the service tool 22 may provide an interface to one or more remotely executed applications with reduced local code execution. In one embodiment, the networked server 24 and the equipment controller 26 may be owned and/or controlled by a common company.

The equipment service system 20 may further include at least one site (i.e., two illustrated as 34, 36 in FIG. 1). Each site 34, 36 may include at least one equipment controller 26 (i.e., three illustrated for each site 34, 36) operable to control one or more equipment components 25. Non-limiting examples of sites 34, 36 may be a building, a geographic region, and others. A non-limiting example of an equipment controller 26 may be an elevator or escalator controller that can be serviced by the manufacturer of the elevator or escalator, and the one or more equipment components 25 can be one or more elevator or escalator components. The service tool 22, the networked server 24, and the equipment controller 26 may each include respective processors 38, 40, 42 (e.g., microprocessors), and storage mediums 44, 46, 48 that may be computer writeable and readable with executable instructions and/or data.

Various credential management operations can be distributed between the service tool 22, the networked server 24, and/or the equipment controller 26. For example, at least one processor 38 of the service tool 22 can determine whether the service tool 22 is located at a location of an equipment service system 20 and/or at least one processor 42 of the equipment controller 26 can determine/confirm the location of the service tool 22. Further, the networked server 24 may also determine or verify the location of the service tool 22. One or more location determination techniques can be employed, such as use of global positioning system (GPS) data, network address information, cellular triangulation, proximity detection, and others. The networked server 24 can be used to establish remote access to sites 34, 36 and/or provide credential authentication services.

Figure 2:
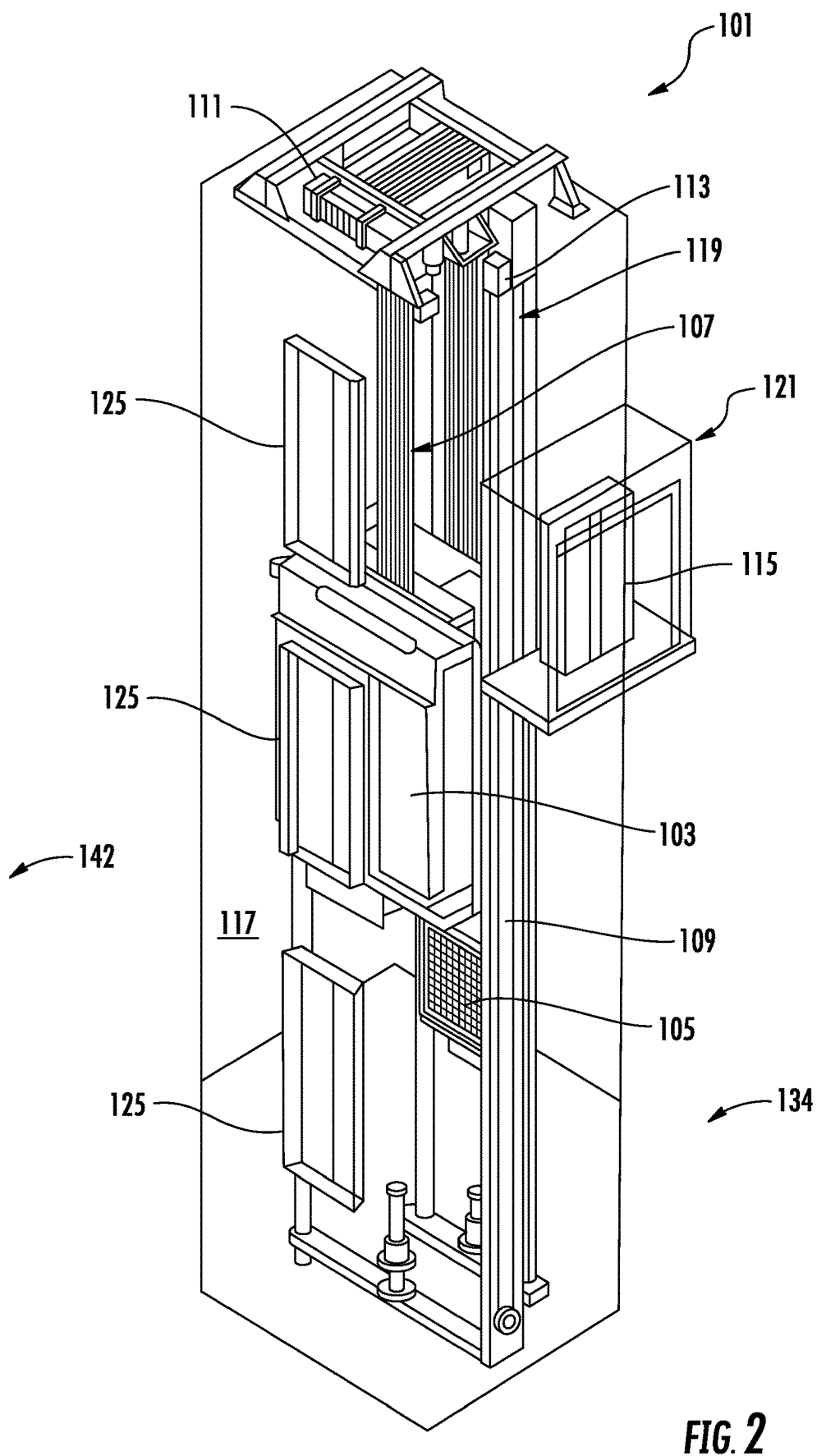
FIG. 2 is a schematic illustration of an elevator system that may employ various embodiments of the present disclosure.

FIG. 2 is a perspective view of an elevator system 101 including an elevator car 103, a counterweight 105, one or more load bearing members 107, a guide rail 109, a machine 111, a position encoder 113, and an elevator controller 115. The elevator system 101 includes examples of various equipment components 25 of FIG. 1, where the elevator controller 115 is an example of the equipment controller 26 of FIG. 1. In some embodiments, the service tool 22 of FIG. 1 requests a credential to wirelessly access the equipment controller 26 at an onsite location 134 of the elevator system 101, and in other embodiments the service tool 22 can request a credential to access the equipment controller 26 while at an offsite location 142. For instance, the onsite location 134 can be within a building/structure that includes the elevator system 101, while the offsite location 142 is external to the building/structure that includes the elevator system 101.

In the example of FIG. 2, the elevator car 103 and counterweight 105 are connected to each other by the load bearing members 107. The load bearing members 107 may be, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109. The load bearing members 107 engage the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In some embodiments, the elevator controller 115 can be configured to control features within the elevator car 103, including, but not limited to, lighting, display screens, music, spoken audio words, etc.

The machine 111 may include a motor or similar driving mechanism and an optional braking system. In accordance with embodiments of the disclosure, the machine 111 is configured to include an electrically driven motor. The power supply for the motor may be any power source, including a power grid, which, in combination with other components, is supplied to the motor. Although shown and described with a rope-based load bearing system, elevator systems that employ other methods and mechanisms of moving an elevator car within an elevator shaft, such as hydraulics, ropeless, or any other methods, may employ embodiments of the present disclosure. FIG. 2 is merely a non-limiting example presented for illustrative and explanatory purposes.

Figure 3:
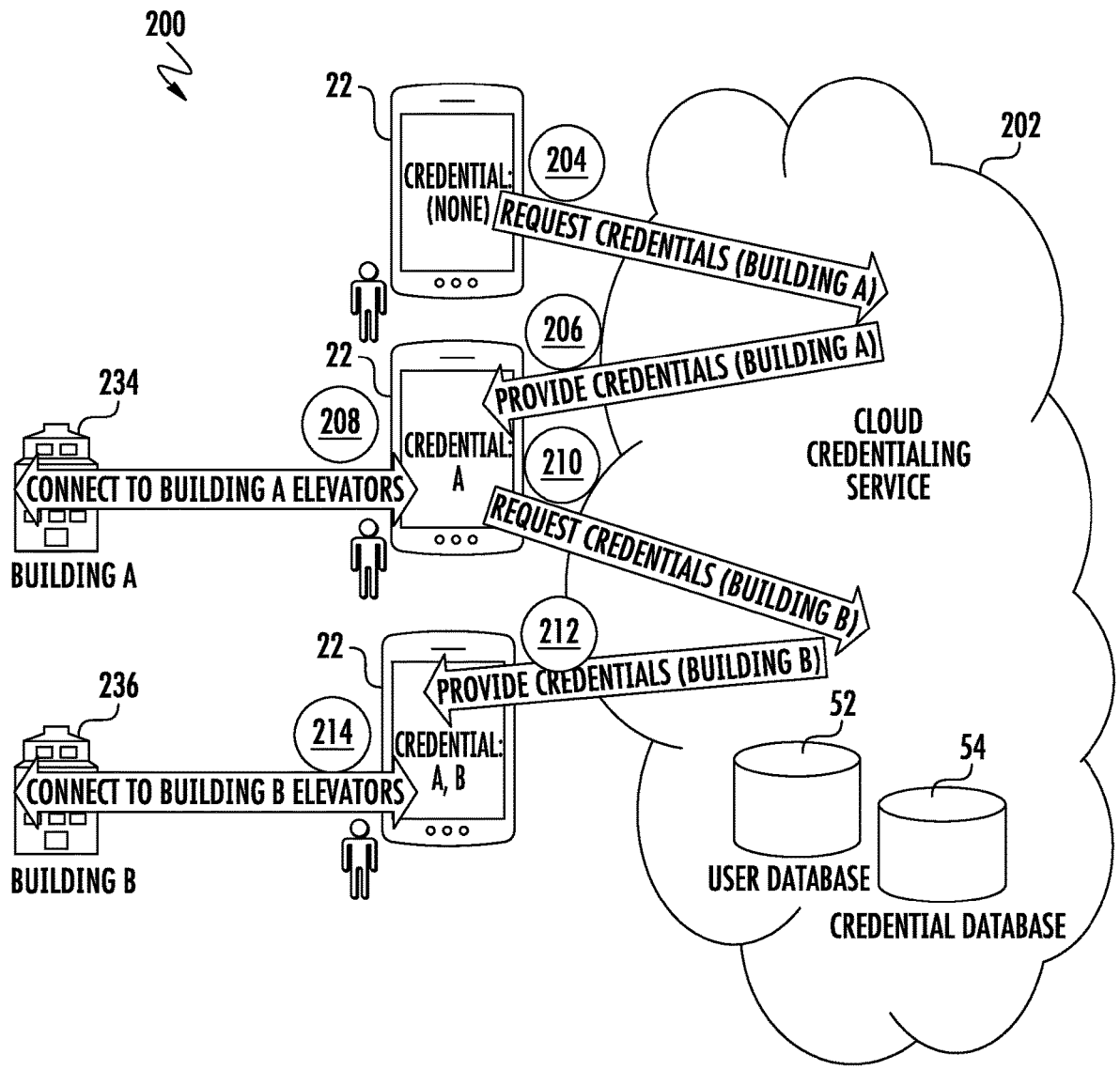
FIG. 3 is a schematic illustration of a credential exchange sequence in accordance with an embodiment of the present disclosure.

FIG. 3 depicts an example of a credential exchange sequence 200 in accordance with an embodiment. The service tool 22 may send a credential request 204 to the cloud credentialing service 202 to access equipment, such as an elevator system 101 (FIG. 2), of building A 234 (e.g. at site 34 of FIG. 1), responsive to a user request through user interface 32 of FIG. 1. The credential request 204 may include information such as one or more of a user identifier (ID), ID verification information (e.g., password, biometric indicator, etc.), a timeframe for planned access, equipment ID or group of equipment (e.g. building A 234, site 34 of FIG. 1, or group of sites), a requested minimum proximity service tool 22 to the elevator system 101, a requested access level, as well as other information associated with the requested access. In response to the credential request 204, the cloud credentialing service 202 can access the user database 52 to verify information about the user of the service tool 22, such as confirming the user ID, ID verification information, access level authorization, and other such information. The cloud credentialing service 202 can also access the credential database 54 upon verifying that the user is authorized and can lookup various rules and constraints based on the access level authorization, such as whether monitoring or parameter modification are allowed, whether the timeframe for planned access complies with time constraints, whether the equipment location/ID information matches known equipment codes, and the like. The cloud credentialing service 202 can reply with an access credential 206 which contains the information needed for the service tool 22 to communicate with the requested elevator systems 101 at the requested access level, and may also include a time constraint indicating when the access credential 206 should be active. For example, the access credential 206 may remain active for one hour, one day, one week, or any other desired amount of time.

The service tool 22 can interface with an equipment controller 26 of FIG. 1 at building A 234 to establish a secure (e.g., encrypted) wireless connection 208 (or wired) utilizing one or more fields of the access credential 206, for instance, to monitor, control, or modify parameters of an elevator system 101 (FIG. 2) at building A 234. The access credential 206 can be stored in the service tool 22 to provide a corresponding level of access as determined by the cloud credentialing service 202. In some embodiments, the level of access for the service tool 22 is adjusted based on a time constraint associated with the access credential 206. For instance, the user may have a four-hour window of elevated access for parameter modification before reverting to a reduced monitor-only level of access unless a credential confirmation/update is performed. In some embodiments, a stored copy of the access credential 206 may be deleted from the service tool 22 when an access period expires based on the time constraint associated with the access credential 206.

The service tool 22 may also send a second credential request 210 to the cloud credentialing service 202 to access equipment, such as an elevator system, of building B 236 (e.g. at site 36 of FIG. 1). The second credential request 210 can be formatted and handled by the cloud credentialing service 202 similar to the credential request 204 to retrieve a second access credential 212. The service tool 22 can interface with an equipment controller 26 of FIG. 1 at building B 236 to establish a secure (e.g., encrypted) wireless connection 214 utilizing one or more fields of the second access credential 212, for instance, to monitor, control, or modify parameters of an elevator system 101 (FIG. 2) at building B 236. The service tool 22 may retain the access credential 206 and the second access credential 212 for different periods of time and with different access levels at respective buildings A and B 234, 236. For instance, the user of the service tool 22 may need monitor-only access at building A 234 but need installation parameter access at building B 236. Similar to the access credential 206, the second access credential 212 may also be deleted or result in a change in the level of access based on a time constraint.

FIG. 4 depicts an example of entries 300 in user database 52 according to an embodiment. The entries 300 can include a plurality of user IDs, such as user IDs 302, 304, 306, 308 with associated ID verification information 312, 314, 316, 318 and associated user types 322, 324, 326, 328. The user IDs 302-308 can be in the form of e-mail addresses, user names, clock numbers, and/or other unique identifiers. The ID verification information 312-318 can include passwords, biometric indicators, challenge questions, and other such information to confirm a user identity. The user types 322-328 can be associated with a predefined level of access for a role of the user and/or a user group. For example, user types 322-328 can map to a mechanic, an adjuster, a customer, an engineer, and/or other roles. The roles of user types 322-328 may be defined in a hierarchy such that a mechanic also has customer permissions and an engineer has full permissions, and other such relationship. It will be understood that additional or fewer fields and any number of entries 300 can be included in user database 52. Furthermore, deviations to permissions can be defined on a user type or per user basis.

FIG. 5 depicts entries 400 as another example of the user database 52 of FIG. 1 to define users 402, and an allowed region 406 as a geographic constraint to access. The users 402 may match the user IDs in 302-308. The allowed region 406 can be defined by a region code for locations of systems/devices to be accessed by the service tool 22. For instance, "Region A" may be defined as systems located in a same city, a portion of a city, a state, a portion of a state, a multi-state area, or any other spatial partitioning. In some embodiments, geographic constraints of each allowed region 406 are further defined in a separate table (not depicted).

FIG. 6 depicts a privileges table 500 that can be part of the credential database 54 of FIG. 1 or exist elsewhere that is accessible by the cloud credentialing service 202 of FIG. 3. The privileges table 500 can include a user type 502 defining a group or role, for instance, along with allowed read data identifiers (IDs) 504, allowed write data IDs 506, and allowed time 508. In some embodiments, the allowed time 508 can support limitations from the current time going forward or be a future scheduled access time, for instance, to limit one or more of: a future access time (e.g., expiring based on when use of the access credential first occurs) and a total access time (e.g., expiring based on when the access credential is provided to the service tool 22). In the example of FIG. 6, a user type 502 of "mechanic" can have default access to read data IDs 1-5 for up to one day. A user type 502 of "adjuster" can read data IDs 6-10 and write data IDs 1-5 for up to seven days. A user type 502 of "customer" can read data IDs 1-4 for up to seven days. A user type 502 of "engineer" can write data IDs 1-15 for up to seven days.

FIG. 7 depicts an exceptions table 600 that allows deviations from the default values defined in privileges table 500 of FIG. 6 on a per user basis. The exceptions table 600 can be part of the user database 52 of FIG. 1 or exist elsewhere and is accessible by the cloud credentialing service 202 of FIG. 3. In the example of FIG. 7, the exceptions table 600 can include users 602 that map to the users 402 of FIG. 5 along with allowed read data IDs 604, allowed write data IDs 606, and allowed time 608. Thus, if UserA is a mechanic as defined in entries 400 of FIG. 5, in addition to being able to read data IDs 1-5 as defined in privileges table 500 of FIG. 6, UserA can also read data ID 9 without an access time constraint as defined in the exceptions table 600. Similarly, other users 602 can be granted access deviations from default privileges defined in the privileges table 500 of FIG. 6.

FIG. 8 depicts entries 700 in the credential database 54 of FIG. 1 according to an embodiment. The entries 700 can include a region 704 that maps to allow region 406 of FIG. 5, a site 705 in the region 704, systems 702 that define which systems are included at each site 705 in each region 704, and keys 706 that include secrets of the access credential. The systems 702 can include one or more equipment components 25 controlled and accessed by an equipment controller 26 at the site 705 in the region 704. The region 704 and site 705 can define a location of each of the systems 702. For example, a region 704 may include multiple buildings, where each building is at a different site 705, and each site 705 can include multiple systems 702. The keys 706 can include one or more fields based on a level of access of a user to enable access on a data ID basis depending on user specific privileges and exceptions. The keys 706 can be part of authentication methods employed in the service tool credential management system 10 of FIG. 1. Keys 706 can be associated with access levels, for example level-1 (L1), level-2 (L2), level-3 (L3), and so forth for read and read/write permissions on a data ID basis. Keys 706 can be uniquely established for each level of access and each of the systems 702. In some instances, multiple systems 702 at the same location (region 704 and site 705) can have a shared instance of the keys 706, such as a same key used to access multiple elevator or escalator systems in a building.

Figure 9:
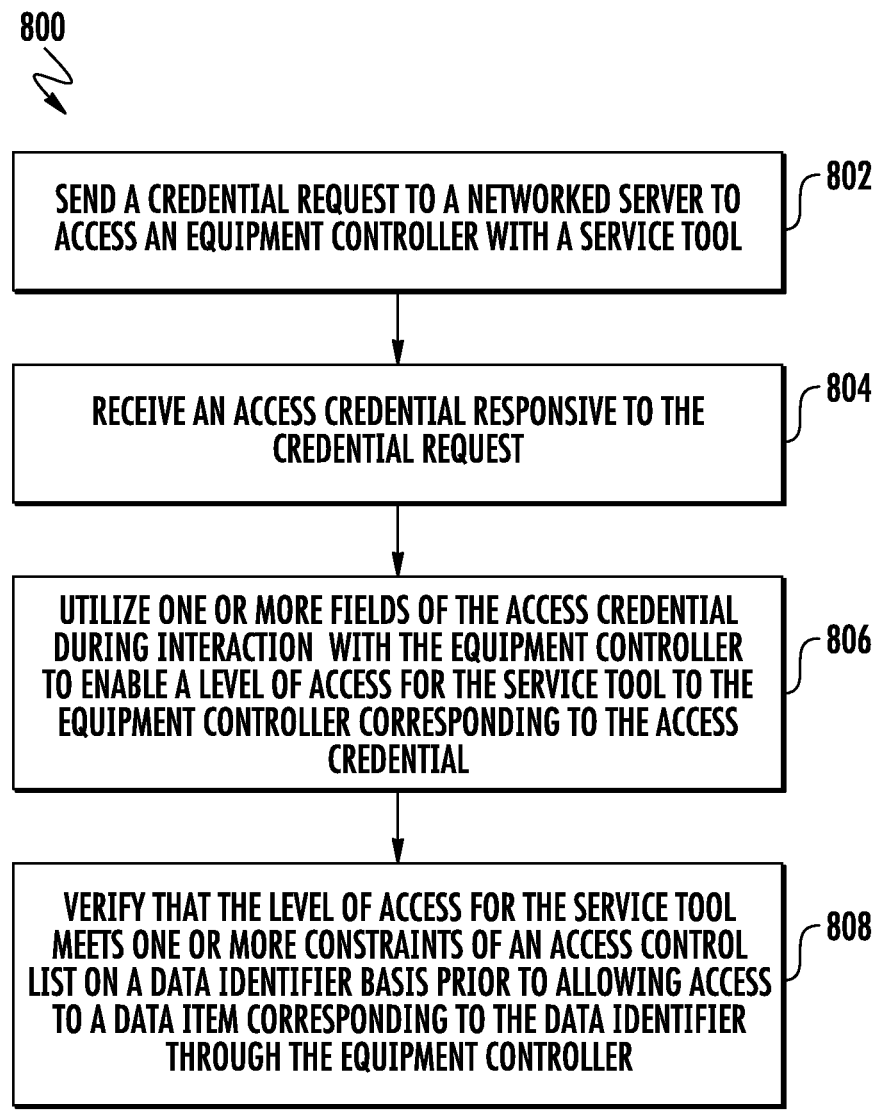
FIG. 9 is a flowchart illustrating a method of service tool credential management in accordance with an embodiment of the present disclosure.

FIG. 9 depicts a flow process 800 that can be performed by the equipment service system 20 of FIG. 1 as shown and described herein and/or by variations thereon. Various aspects of the flow process 800 can be carried out using one or more sensors, one or more processors, and/or one or more machines and/or controllers. For example, some aspects of the flow process involve user interfaces, as described above, in communication with a processor or other control device and transmit information thereto. The flow process 800 is described in reference to FIGS. 1-9.

At block 802, a credential request 204 is sent to a networked server 24 to access an equipment controller 26 and/or a set of controllers with a service tool 22. The networked server 24 can provide a cloud credentialing service 202 operable to transmit an access credential 206 responsive to the credential request 204. The access credential 206 can be provided based on a particular user ID and/or user type according to default values of privileges and any exceptions as previously defined.

At block 804, the access credential 206 is received at the service tool 22 responsive to the credential request 204. The cloud credentialing service 202 is operable to access a user database 52 to confirm user information of the service tool 22 and a credential database 54 to retrieve the access credential 206 based on a corresponding value from the user database 52 (e.g., matching a user type and/or user ID). The service tool 22 can acquire and store a plurality of credentials associated with a plurality of service locations, such as access credentials 206, 212 for building A 234 and building B 236.

At block 806, one or more fields of the access credential 206 are used to establish communication to the equipment controller 26 (e.g., keys 706) to enable access for the service tool 22 through the equipment controller 26 corresponding to the access credential 206. The level of access for the service tool 22 can be set based on a location (e.g., a region, site, etc.) of a system controlled by the equipment controller 26. The one or more fields of the access credential 206 can include at least one key 706 associated with the location, the system, and the level of access. The level of access can include one or more of: no access, read-only access and modification access assignable on an individual feature or group of features basis for various data IDs 1-15. The service tool 22 and the equipment controller 26 can establish communication using encrypted communication on a wireless link (e.g., secure wireless connection 208 on communication pathway 30).

At block 808, the level of access for the service tool 22 can be verified as meeting one or more constraints on a data identifier basis prior to allowing access to a data item corresponding to the data identifier through the equipment controller 26. The one or more constraints can be set based on a user type 502 (e.g., as defined in the privileges table 500) subject to one or more deviations (e.g., per the exceptions table 600) defined for users 602 of the service tool 22. The equipment controller 26 can communicate with the networked server 24 to verify one or more fields of the access credential 206 of the service tool 22, for instance, using entries 700 of the credential database 54 and/or other supporting information.

The level of access for the service tool 22 can be limited based on a time constraint, such as allowed time 508, 608. The time constraint can limit one or more of: a future access time and a total access time. For instance, a mechanic with an allowed time 508 of one day may have a level-one (L1)

key revoked one day after receiving the L1 key or one day after first using the L1 key to access the equipment controller 26.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A service tool credential management system comprising:
    a service tool comprising:
    a non-transitory storage medium operable to store a plurality of instructions; and
    at least one processor configured to execute the instructions to:
        send a credential request from the service tool to a networked server via a first communication pathway to access an equipment controller with the service tool via a second communication pathway, wherein the equipment controller is configured to control and monitor one or more elevator or escalator components;
        receive an access credential responsive to the credential request; and
        utilize one or more fields of the access credential during interaction with the equipment controller via the second communication pathway to enable a level of access for the service tool to the equipment controller corresponding to the access credential based on the equipment controller verifying at least a portion of the access credential with the networked server via a third communication pathway,
        wherein the level of access for the service tool is set based on a location of a system controlled by the equipment controller, and wherein the one or more fields of the access credential comprise at least one key associated with the location, the system, and the level of access.

2. The service tool credential management system set forth in claim 1, wherein the networked server provides a cloud credentialing service operable to transmit the access credential responsive to the credential request.

3. The service tool credential management system set forth in claim 2, wherein the cloud credentialing service is operable to access a user database to confirm user information of the service tool and a credential database to retrieve the access credential based on a corresponding value from the user database.

4. The service tool credential management system set forth in claim 1, wherein the level of access for the service tool is limited based on a time constraint.

5. The service tool credential management system set forth in claim 1, wherein the service tool acquires and stores a plurality of credentials associated with a plurality of service locations.

6. The service tool credential management system set forth in claim 1, wherein the level of access comprises one or more of: no access, read-only access, and modification access assignable on an individual feature or group of features basis.

7. The service tool credential management system set forth in claim 1, wherein the level of access for the service tool is verified as meeting one or more constraints on a data identifier basis prior to allowing access to a data item corresponding to the data identifier through the equipment controller.

8. The service tool credential management system set forth in claim 7, wherein the one or more constraints are set based on a user type subject to one or more deviations defined for a user of the service tool.

9. A method of service tool credential management comprising:
    sending a credential request from a service tool to a networked server via a first communication pathway to access an equipment controller with the service tool via a second communication pathway, wherein the equipment controller is configured to control and monitor one or more elevator or escalator components;
    receiving an access credential at the service tool responsive to the credential request; and
    utilizing, by the service tool, one or more fields of the access credential during interactions with the equipment controller via the second communication pathway to enable a level of access for the service tool to the equipment controller corresponding to the access credential based on the equipment controller verifying at least a portion of the access credential with the networked server via a third communication pathway,
    wherein the level of access for the service tool is set based on a location of a system controlled by the equipment controller, and wherein the one or more fields of the access credential comprise at least one key associated with the location, the system, and the level of access.

10. The method set forth in claim 9, wherein the networked server provides a cloud credentialing service operable to transmit the access credential responsive to the credential request.

11. The method set forth in claim 10, wherein the cloud credentialing service is operable to access a user database to confirm user information of the service tool and a credential database to retrieve the access credential based on a corresponding value from the user database.

12. The method set forth in claim 9, wherein the level of access for the service tool is limited based on a time constraint.

13. The method set forth in claim 9, wherein the service tool acquires and stores a plurality of credentials associated with a plurality of service locations.

14. The method set forth in claim 9, wherein the level of access comprises one or more of: no access, read-only access and modification access assignable on an individual feature or group of features basis.

15. The method set forth in claim 9, wherein the level of access for the service tool is verified as meeting one or more constraints on a data identifier basis prior to allowing access to a data item corresponding to the data identifier through the equipment controller.

16. The method set forth in claim 15, wherein one or more constraints are set based on a user type subject to one or more deviations defined for a user of the service tool.

\* \* \* \* \*